(12) United States Patent
Kubacki (10) Patent No.: US 7,610,874 B2
(45) Date of Patent: Nov. 3, 2009

(54) POLED PLASMA DEPOSITION

(76) Inventor: Ronald M. Kubacki, 3514 Rollingside Dr., San Jose, CA (US) 95148

( * ) Notice: Subject to any disclaimer, the term of this patent is extended or adjusted under 35 U.S.C. 154(b) by 0 days.

(21) Appl. No.: 10/831,249

(22) Filed: Apr. 24, 2004

(65) Prior Publication Data

US 2004/0194889 A1   Oct. 7, 2004

Related U.S. Application Data (62) Division of application No. 10/322,895, filed on Dec. 18, 2002, now Pat. No. 6,767,590.

(51) Int. Cl.
  *C23C 16/503*  (2006.01)
  *C23C 16/509*  (2006.01)
  *C23F 1/00*    (2006.01)
  *H01L 21/306*  (2006.01)
  *C23C 16/22*   (2006.01)

(52) U.S. Cl. .............. 118/723 E; 156/345.43; 156/345.45

(58) Field of Classification Search ...... 156/345.43–47, 156/345.45; 118/723 E, 723 ER
See application file for complete search history.

(56) References Cited

U.S. PATENT DOCUMENTS 5,217,501 A * 6/1993 Fuse et al. .............. 29/25.01
5,306,572 A * 4/1994 Ohashi et al. ............ 428/690
5,932,302 A * 8/1999 Yamazaki et al. ......... 427/577

OTHER PUBLICATIONS

Basic Electrical Engineering 5th Ed., A.E.Fitzgerald et al, McGraw-Hill Book Co., pp. 855.*

* cited by examiner

*Primary Examiner*—Rudy Zervigon (57) ABSTRACT

A poled polymer structure is formed on the surface of a substrate by poling a nonlinear optical reactant during a plasma polymerizing deposition of the reactant onto the surface. The substrate is fixed between the positive plasma-generating and ground electrodes in an air-evacuated chamber so that the substrate electrically floats relative to the electrodes. This arrangement permits the application of an electrostatic poling field to the depositing polymer structure while the plasma excitation power is maintained. The electrostatic poling field is produced by the application of a dc voltage to poling electrodes that can be arranged in various configurations relative to the substrate.

10 Claims, 6 Drawing Sheets

POLED PLASMA DEPOSITION

CROSS REFERENCE TO RELATED APPLICATIONS

This application is a division of U.S. application Ser. No. 10/322,895, filed Dec. 18, 2002, now U.S. Pat. No. 6,767,590, which is incorporated herein by reference in its entirety.

FIELD OF THE INVENTION

The present invention relates generally to poled plasma depositions, and in particular, to a deposition wherein a poled polymer structure is formed by applying a poling field during the plasma polymerization process.

BACKGROUND OF THE INVENTION

Nonlinear optical devices formed from poled polymer structures are used in numerous applications, such as planar waveguide modulators or second harmonic generators in integrated circuits. Typically the poled polymer structure is fabricated by poling a polymer film after the film has been formed. For example, a polymer film containing chromophores with high polarizabilities can be heated to near its glass transition temperature and subjected to an electrostatic field (poled power supply) to align the chromophores based upon their dipole moments. When the polymer film is cooled, the molecules are frozen in the oriented (poled) position. While this is a straightforward process, there are disadvantages. One significant disadvantage is the gradual relaxation of the oriented position over time, and hence, instability in the nonlinear characteristics of the film. Another disadvantage is the multi-step process of: forming the polymer structure; thermal cycling the structure to near glass transition temperature; applying a relatively large electrostatic poling field to the structure; and bringing the polymer structure back to room temperature. Therefore there is the need for a poled polymer structure that can be formed in a single stage process while exhibiting an extended temporal stability.

BRIEF SUMMARY OF THE INVENTION

In one aspect, the present invention is an apparatus for and method of depositing a poled plasma film on a substrate in a substantially air-tight chamber. The substrate is disposed between a positive plasma-generating electrode and a ground electrode that are connected to a plasma excitation power source. Poling electrodes are provided in the chamber and connected to a dc voltage source so that a nonlinear optical reactant that is injected into the chamber can be poled as the plasma generated from the reactant induces polymerization and initiates a deposition onto a surface of the substrate to produce a poled polymer film on the substrate in the region of the electrostatic field established by the dc voltage.

The poling electrodes may be arranged in alternative configurations within the chamber. Positive and negative poling electrodes may be arranged in contact with the surface of the substrate and the poled plasma deposition on the substrate may be accomplished within a gap between the poling electrodes. In another arrangement, the positive and negative poling electrodes are arranged with a gap between them in the vicinity of the substrate's surface that opposes the deposition surface of the substrate. The electrostatic field established by the dc voltage penetrates through the substrate and into the deposition region of the surface. In another arrangement, the positive poling electrode is disposed in the vicinity of the surface of the substrate facing away from the ground electrode, and the ground electrode serves as the negative poling electrode. In this arrangement, the poled plasma deposition takes place on the surface of the substrate facing the ground electrode.

These and other aspects of the invention are set forth in the specification and appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1A:
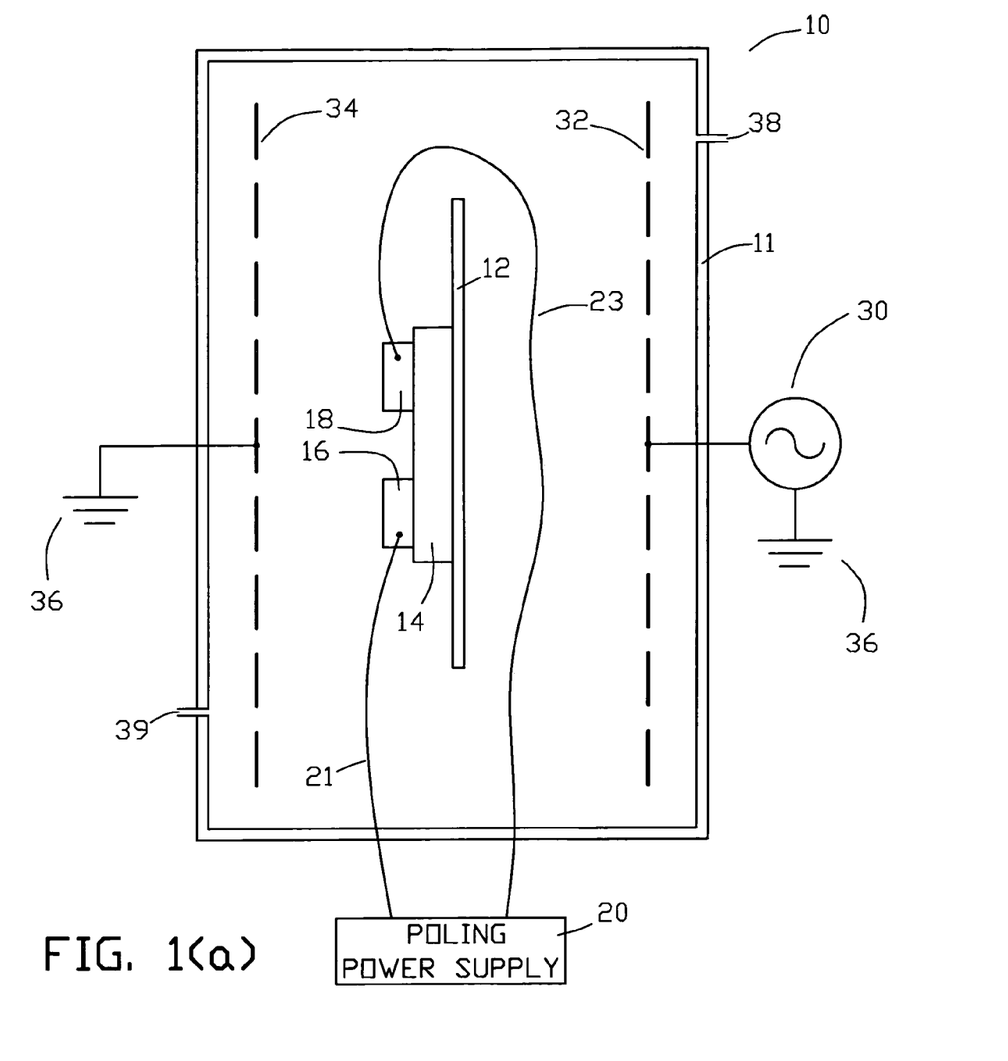
FIG. 1(a) is a diagrammatic arrangement of one example of a plasma deposition reaction and poling chamber system of the present invention.

FIG. 1(a) is a diagrammatic illustration of one example of a plasma deposition reaction and poling chamber system 10 that can be used to perform the poled plasma deposition process of the present invention. Chamber 11 forms a substantially air-tight enclosure in which the plasma deposition and poling is performed in a substantially vacuum environment. Substrate 14 is fixtured in chamber 11. In this example non-limiting example of the invention, platen 12 holds substrate 14 in place within chamber. Positive poling electrode 16 and negative poling electrode 18 are in contact with, or fixed to, substrate 14 in an arrangement that forms a gap between the electrodes. The poling electrodes are suitably connected to dc power source 20 by connectors 21 and 23 via suitable feed throughs in the wall of chamber 11. Plasma excitation power generator 30 (with suitable matching network, if required) provides plasma excitation power to positive plasma-generating electrode 32 via a suitable feedthrough in chamber 11. Ground electrode 34 is suitably connected to electrical ground potential at common system ground point 36. A suitable but non-limiting choice of plasma excitation power is radio frequency (RF) energy, and in particular, RF energy in the range from 25 kHz to 300 MHz. For the poled plasma deposition process of the present invention, substrate 14, upon which the material will be plasma-deposited while being poled, is not in contact with, or fixtured upon, positive plasma-generating electrode 32 or ground electrode 34. Substrate 14 is disposed in a region between the positive plasma-generating electrode and the ground electrode, preferably, but not by way of limitation, in the approximate centrally located region between electrodes 32 and 34. This location is a relatively stable region within the generated plasma where there is substantially no net plasma charge density. Further, substrate 14 electrically "floats" in the positive column; that is, the substrate is electrically isolated from the positive plasma-generating electrode and ground electrode, and is neither grounded nor "excited" with respect to the RF power that initiates the plasma polymerization. This provides a high level of plasma control with capacitively-coupled plasma electrodes. With this arrangement, the substrate tends to have a minimal perturbation upon the plasma within the reaction chamber during plasma deposition on substrate 14 while poling is performed. Inlet port 38 provides a means for injecting a plasma reactant into chamber 11 and outlet port 39 provides a means for removing unused reactant and/or byproducts from the chamber. Control of reactant flow rates at the inlet and outlet ports allows performing the poled plasma deposition at a selected process pressure for the plasma reactant as further disclosed below. In other examples of the invention, multiple inlet and/or outlet ports may be provided for use with one or more types of plasma reactants.

Figure 1B:
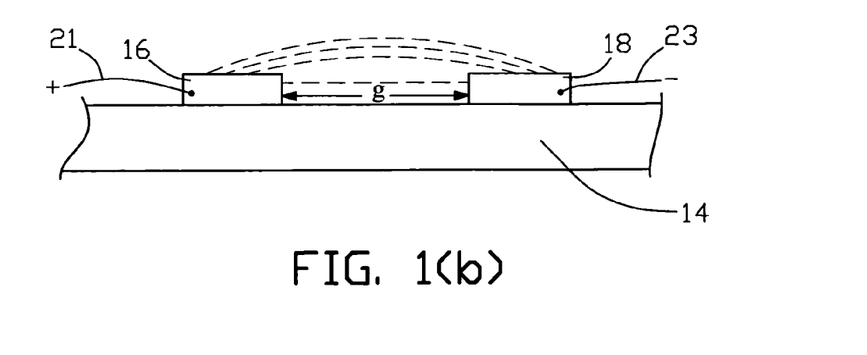
FIG. 1(b) is a detailed view of one arrangement of a substrate and poling electrode used in the plasma deposition reaction and poling chamber system of the present invention as shown in FIG. 1(a).

A suitable but non-limiting choice of substrate is a glass or silicon wafer upon which suitable poling electrodes 16 and 18 can be brought in contact with or affixed. One method of attaching the poling electrodes to the substrate is by lithographic patterning and deposition of a suitable electrode material such as chrome or gold. The poling electrodes are positioned to establish an electrode gap, g, between them as illustrated in detailed view FIG. 1(b). The dashed lines in FIG. 1(b) illustrate representative electromagnetic lines of force of the electrostatic field that is established between the poling electrodes when a dc voltage potential difference is applied between the electrodes. Not shown in the drawings is an optional electrically insulating substrate holder, which can be fabricated from a machineable glass bonded mica composite. The composite has excellent chemical resistance in the plasma discharge while functioning as an electrical insulator of the patterned substrate from the substrate platen, which, in this arrangement, can be an aluminum plate. If used, the electrically insulated substrate holder can serve as intermediate connection points for connectors 21 and 23 from which terminal connections to the poling electrodes can be made. That is, the electrical connections from the poling power source may optionally be made directly to the poling electrodes, as shown in the figures, or suitable intermediate connection points within the chamber, and from these points to the poling electrodes. Poling power source 20 may be any suitable dc power supply, preferably with a low current output, that can apply a dc voltage to the poling electrodes, and consequentially a voltage potential difference across the gap. Typically, the negative poling voltage is connected to the system ground.

Chamber 11 is prepared for a poled deposition by first evacuating air from the chamber with a suitable vacuum pump to establish a substantially vacuum environment in the chamber for the plasma reaction, and then injecting the reactant into the chamber. Preferably, the electrostatic poling field is first established by application of the poling voltage from poling power source 20. Then suitable plasma excitation energy is applied to positive plasma-generating electrode 32 from plasma excitation generator 30. Alternatively, for example, when the reactants can produce a non-poled plasma deposited film with superior adhesion properties, the plasma excitation energy may be first applied prior to establishing the electrostatic poling field so that the initial non-poled deposition layer of the film immediately adjacent to the substrate achieves the desired adhesion of the film to the substrate before establishing the poling field. While the applied poling voltage generally remains substantially constant during the poled plasma deposition process, the applied poling voltage may be variable, alternating or pulsing during the poled plasma deposition to achieve particular poled polymer properties in the deposited film. Further an electrically insulating mask may optionally be applied over the poling electrodes prior to performing the poled plasma deposition of the present invention. Subsequent to the poled deposition, the insulating material over the poling electrodes, if used, and the poling electrodes themselves can be removed by, for example, a suitable etching process, and the deposited poled polymer film or structure can be subjected to further processing steps as known in the art, such as the deposition of other materials that may be used, for example, to fabricate a complete integrated circuit or photonic device.

Figure 2A:
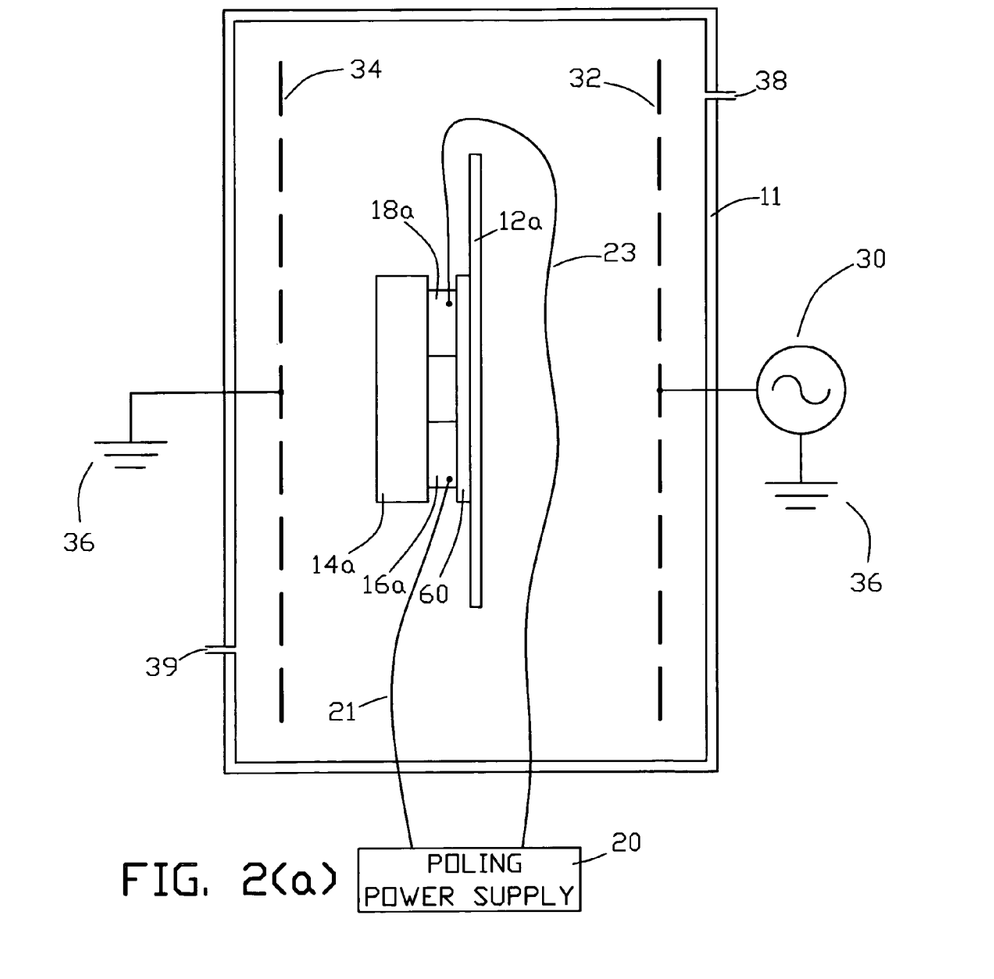
FIG. 2(a) is a diagrammatic arrangement of another example of a plasma deposition reaction and poling chamber system of the present invention.
Figure 2B:
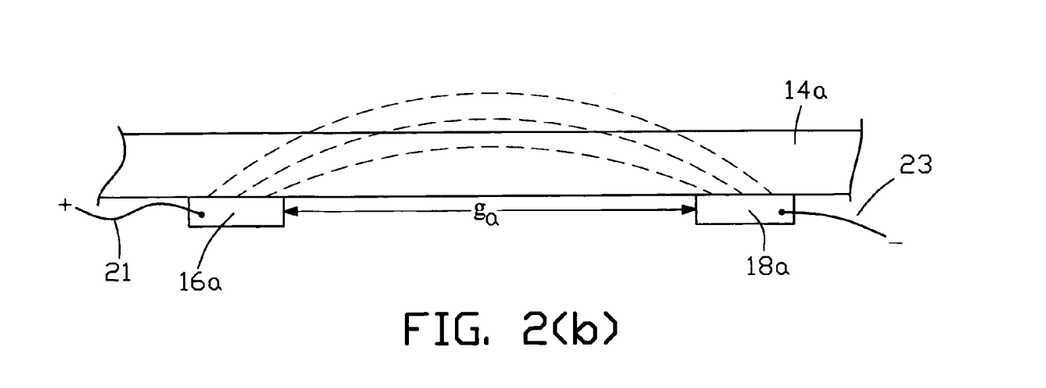
FIG. 2(b) is a detailed view of one arrangement of a substrate and poling electrode used in the plasma deposition reaction and poling chamber system shown in FIG. 2(a).

FIG. 2(a) is a diagrammatic illustration of another example of a plasma deposition reaction and poling chamber system that can be used to perform the poled plasma deposition process of the present invention. In this example, poling electrodes 16a and 18a are disposed below substrate 14a and are separated from platen 12a by electrically insulating layer 60, which is used if the platen is formed from an electrically conductive material. Alternatively the poling electrodes may be partially or fully embedded in insulating layer 60. Poling electrodes 16a and 18a, in some examples of the invention, are in contact with, or fixed to, a first surface of substrate 14a to form a gap, $g_a$, between the electrodes, and as illustrated in the detailed view in FIG. 2(b). The dashed lines in FIG. 2(b) illustrate representative electromagnetic lines of force of the electrostatic field that is established between the poling electrodes when a dc voltage potential difference is applied between the electrodes. As illustrated in FIG. 2(b), the field penetrates at least partially through and above substrate 14a in a region above a second surface of the substrate that opposes the first surface of the substrate. In this region, a poled plasma deposition on the substrate can be accomplished similar to that disclosed above for the arrangement in FIG. 1(a) and FIG. 1(b). The selected deposition region for the poled plasma deposition may be surrounded by a suitable mask to restrict poled plasma deposition to the selected region. Since in this example of the invention, the poled plasma film is deposited in a region of the substrate where the electrostatic poling field extends through the substrate, and not in the gap between the poling electrodes, poling electrodes 16a and 18a do not have to be in contact with the substrate. The poling field must be of sufficient strength and distribution to establish a field in the deposition region on the substrate where the poled plasma deposition will take place.

Figure 3A:
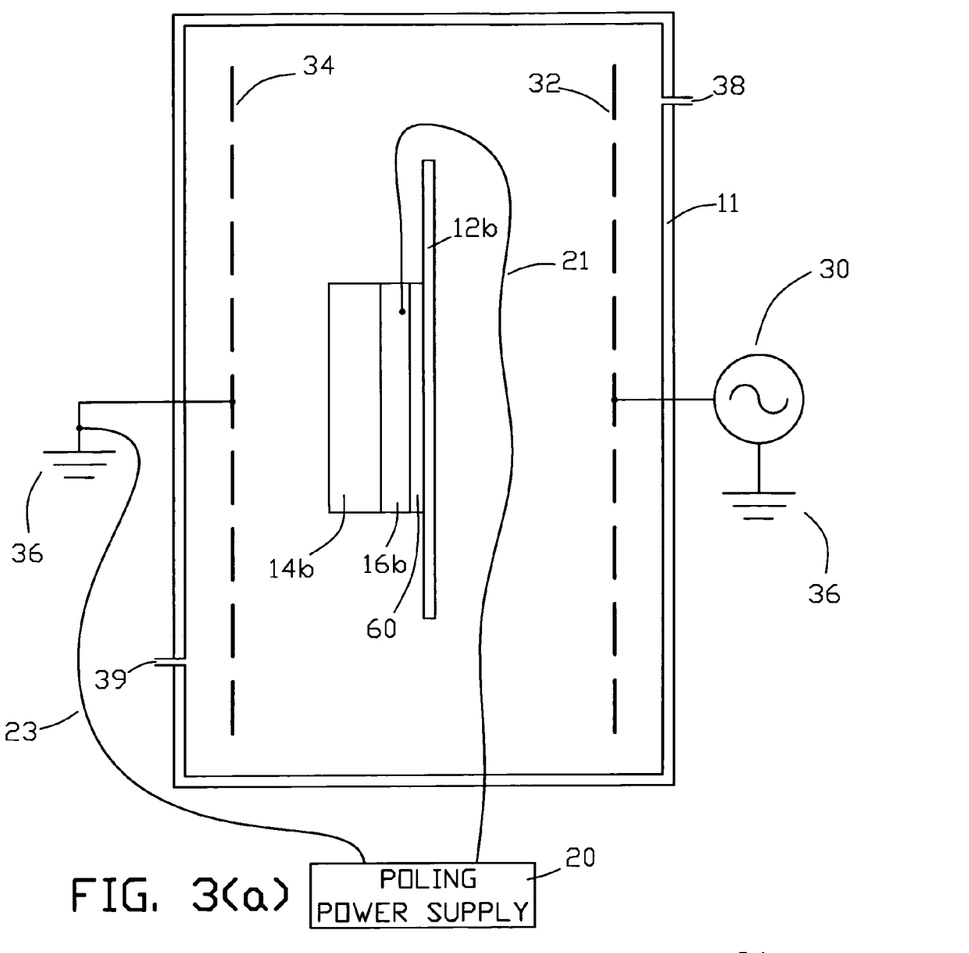
FIG. 3(a) is a diagrammatic arrangement of another example of a plasma deposition reaction and poling chamber system of the present invention.
Figure 3B:
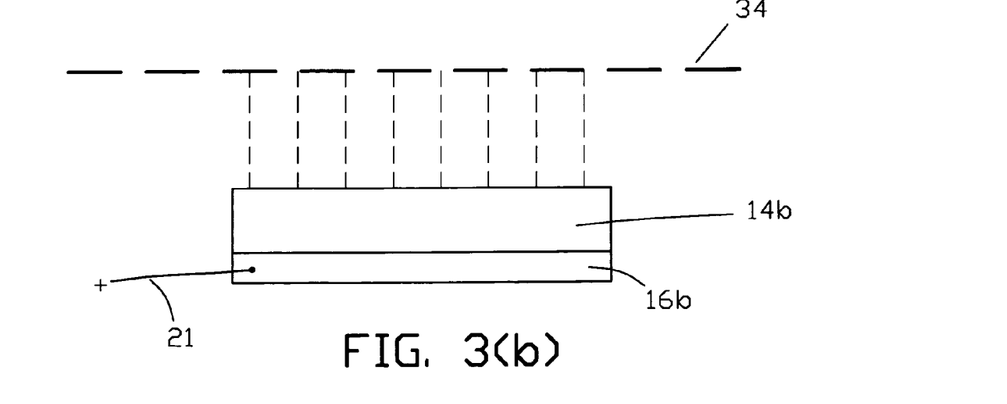
FIG. 3(b) is a detailed view of one arrangement of a substrate and poling electrode used in the plasma deposition reaction and poling chamber system shown in FIG. 3(a).

FIG. 3(a) is a diagrammatic illustration of another example of a plasma deposition reaction and poling chamber system that can be used to perform the poled plasma deposition process of the present invention. In this example, positive poling electrode 16b is disposed below substrate 14b and is separated from platen 12b by electrically insulating layer 60, which is used if the platen is formed from an electrically conductive material. Alternatively the positive poling electrode may be partially or fully embedded in insulating layer 60. Ground electrode 34 serves as a ground plane for the plasma excitation, as in the previous examples, and, in addition, as the negative poling electrode. Although the ground electrode and negative poling electrode are shown diagrammatically in FIG. 3(a) as a common element, they may each be uniquely configured and interconnected to form an electrically common element. Consequently, the negative voltage output of the poling power source can be connected to any convenient system ground point, such as common system ground point 36, or directly to ground electrode 34 by connector 23. In this example of the invention, a poled plasma film can be deposited over the entire surface of substrate 14b that is opposite the substrate's surface in the vicinity of positive poling electrode 16b. Alternatively selected deposition regions can be defined by suitable masking of the substrate's surface. In this example of the invention, the electrostatic poling field, as representatively illustrated by the lines of electromagnetic force (dashed lines) in FIG. 3(b), is generally perpendicular to the deposition surface of the substrate, whereas in the previous examples, the poling field was generally parallel to the surface of the substrate in the region of the poled plasma deposition. This perpendicular orientation for poling is commonly referred to as corona poling.

Upon completion of the poled plasma deposition by any of the above examples of the invention, the deposited poled polymer can be used as a light waveguide structure in applications wherein an electrostatic field is applied across the structure to dynamically alter its optical properties, such as optical modulators, optical switches and wavelength agile photonic structures.

Figure 4:
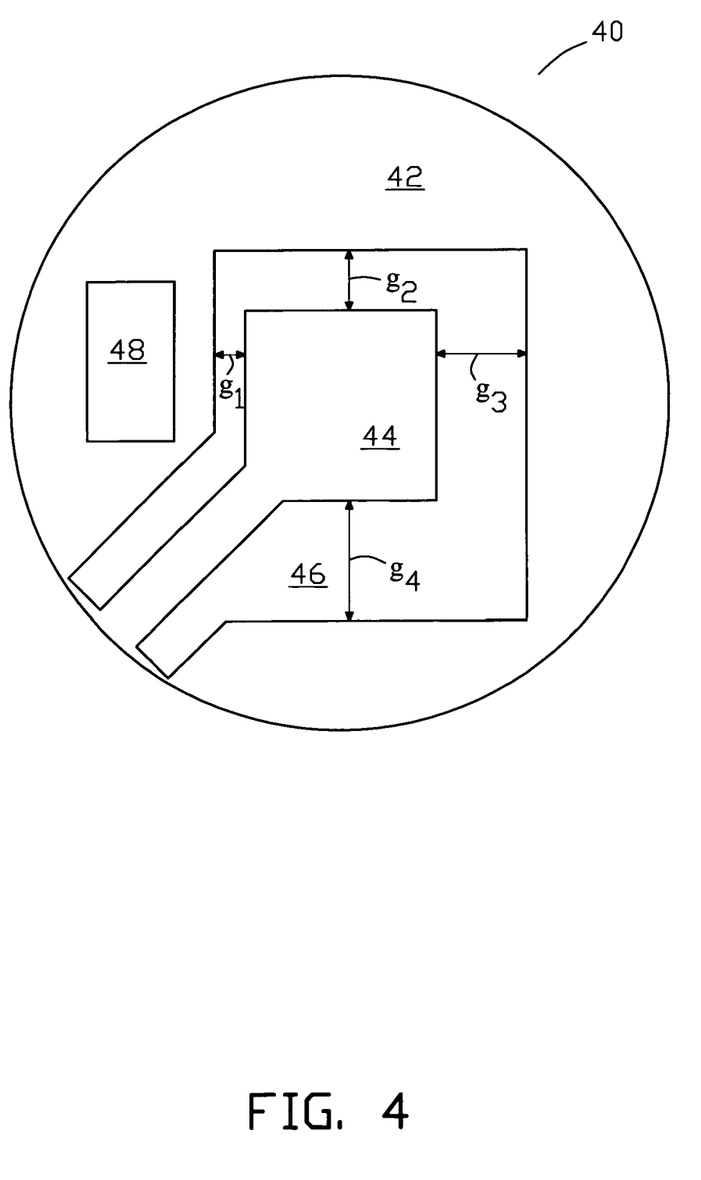
FIG. 4 is a diagrammatic arrangement of non-poled and poled plasma depositions on a substrate in one example of the present invention.
Figure 5:
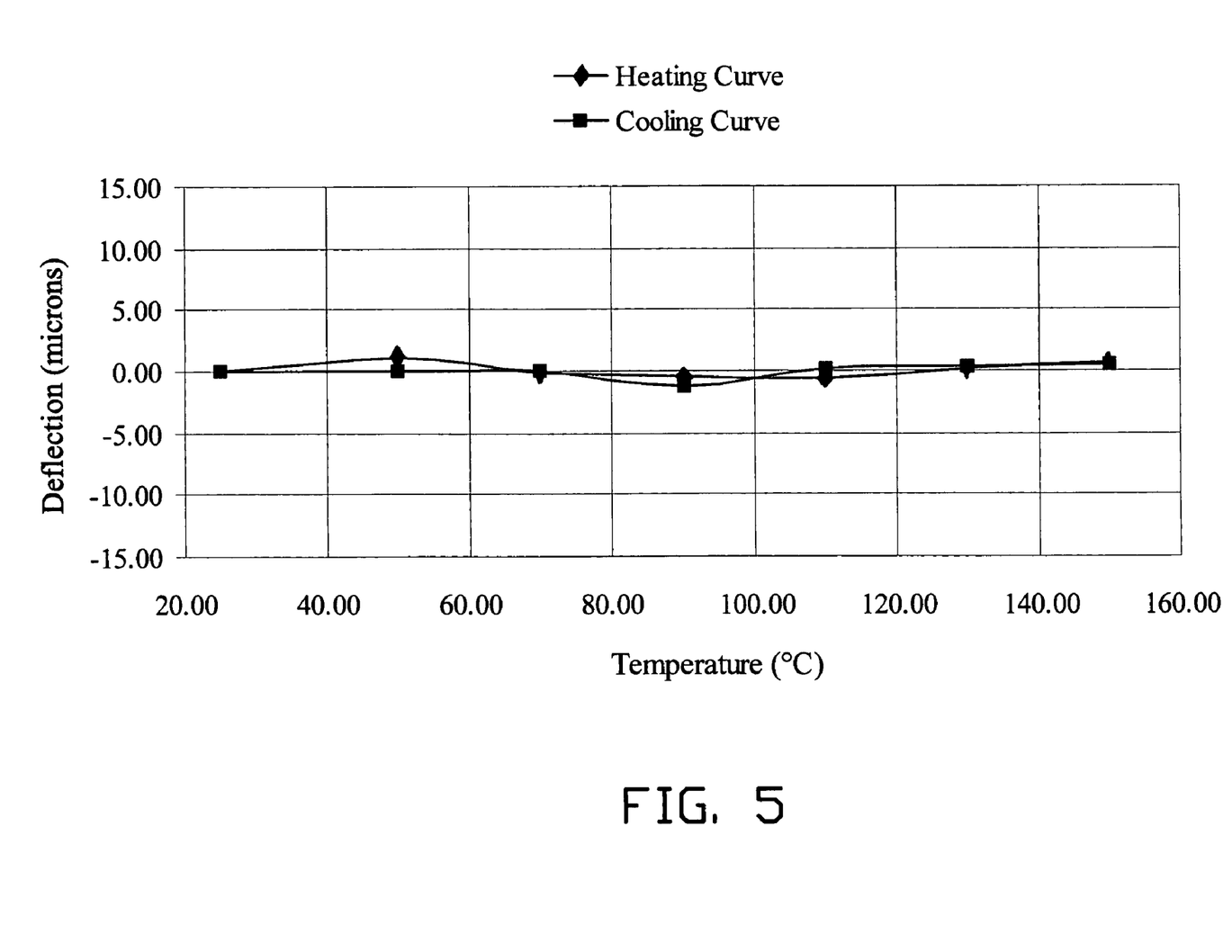
FIG. 5 is a graph illustrating the thermal stability of a poled polymer structure formed from one example of a poled plasma deposition of the present invention.

In one group of non-limiting examples of the invention, four circular glass substrates were used for non-poled and poled depositions of a single reactant with poled electrode gaps of 1.5, 3.0, 4.5 and 6.0 micrometers (μm) as diagrammatically illustrated by gaps $g_1$, $g_2$, $g_3$ and $g_4$, respectively, on a substrate 40 in FIG. 4 using the example of the invention illustrated in FIG. 1(a) and FIG. 1(b). The non-limiting choice for the single reactant that was used to form the poled plasma depositions on the glass substrates was produced from a nonlinear optical material (generally referred to as side group or guest material) in a backbone or host material. The selected guest material for these examples of the invention was Disperse Red Dye 1 (4-(N-ethyl-N-(2-hydroxyethyl))-amino-4'-nitroazobenzene), 10% by weight, in a host solution of methyl methacrylate monomer, which was injected into the chamber as a vapor for the poled plasma reaction. Other suitable guest materials include chromophores or dyes having aromatic rings or conjugated bonds, such as N,N-dimethylaminonitrostilbene. Other suitable host materials include glassy, thermoplastic polymers in general, and polyurethane, polydiacetylene, polysiloxane and polysilane. Generally known guest and host materials for producing non-linear poled polymer structures by conventional methods are suitable for the poled polymer deposition processes of the present invention. See, for example, *Polymers for Second-order Nonlinear Optics*, G. A. Lindsay and K. D. Singer, eds. (ACS Books, Symp. Ser. 601, Washington, D.C., 1995). Each of the four substrates had a different poling voltage applied across inner poling positive electrode 44 and outer poling negative electrode 42, which were formed on the substrate by a lithographic process. Poled plasma depositions with the four different gap widths were made in deposition region 46. A non-poled plasma deposition was made in deposition region 48, which was located entirely within the negative (ground) electrode 42. The achieved poled field strength, in megavolts per centimeter (MV/cm), of the resulting poled polymer deposited structure is disclosed in Table 1(a) through Table 1(d). For all depositions, the plasma excitation power is RF energy applied at a frequency of 13.56 megahertz.

TABLE 1(a)

Poled deposition with 25 volts dc poling voltage

| Electrode gap (μm) | Field strength (MV/cm) |
|---|---|
| 1.5 | 0.17 |
| 3.0 | 0.09 |
| 4.5 | 0.045 |
| 6.0 | 0.022 |

TABLE 1(b)

Poled deposition with 50 volts dc poling voltage

| Electrode gap (μm) | Field strength (MV/cm) |
|---|---|
| 1.5 | 0.33 |
| 3.0 | 0.17 |
| 4.5 | 0.09 |
| 6.0 | 0.045 |

TABLE 1(c)

Poled deposition with 100 volts dc poling voltage

| Electrode gap (μm) | Field strength (MV/cm) |
|---|---|
| 1.5 | 0.66 |
| 3.0 | 0.33 |
| 4.5 | 0.17 |
| 6.0 | 0.09 |

TABLE 1(d)

Poled deposition with 200 volts dc poling voltage

| Electrode gap (μm) | Field strength (MV/cm) |
|---|---|
| 1.5 | 1.33 |
| 3.0 | 0.66 |
| 4.5 | 0.33 |
| 6.0 | 0.17 |

Typical, but non-limiting, poled plasma deposited film thickness was two micrometers with a chrome and aluminum composite poling electrode thickness of one micrometer. In other applications, specific configurations of the poling electrodes are driven by the requirements of the particular device being fabricated.

A METRICON CORP. (Pennington, N.J.) Model 2010 Prism Coupler was used to measure the index of refraction with a 632.8 nanometer laser source for the above poled plasma deposited samples with a 1.5 μm electrode gap and a 6.0 μm electrode gap for the transverse electric (TE) mode (electric field in the plane of the poled polymer structure), namely the $n_{TE}$ index of refraction, and the transverse magnetic (TM) mode (magnetic field in the plane of the poled polymer structure), namely the $n_{TM}$ index of refraction. The results were as indicated in Table 2(a) and Table 2(b).

TABLE 2(a)

Index of refraction for samples with 1.5 μm electrode gap

| Poling field strength (MV/cm) | 0.0 | 0.17 | 0.33 | 0.66 | 1.33 |
|---|---|---|---|---|---|
| $n_{TE}$ | 1.5098 | 1.5113 | 1.5112 | 1.5114 | 1.5116 |
| $n_{TM}$ | 1.5101 | 1.5129 | 1.5130 | 1.5131 | 1.5133 |

TABLE 2(b)

Index of refraction for samples with 6.0 μm electrode gap

| Poling field strength (MV/cm) | 0.0 | 0.022 | 0.045 | 0.09 | 0.17 |
|---|---|---|---|---|---|
| $n_{TE}$ | 1.5098 | 1.5098* | 1.5110 | 1.5113 | 1.5113 |
| $n_{TM}$ | 1.5101 | 1.5101* | 1.5123 | 1.5127 | 1.5129 |

*For the sample produced with the 6.0 μm electrode gap, the 0.022 MV/cm field was not sufficient to pole the plasma deposited material.

For the non-poled samples (i.e., 0.0 poling field strength in Table 2(a) and Table 2(b)), the deposited film should be generally isotropic, and the 0.0003 difference between $n_{TE}$ and $n_{TM}$ is attributed to experimental error. The greater differences between $n_{TE}$ and $n_{TM}$ in the poled polymer structures is indicative of nonlinear structures.

Temporal stability of one sample, namely the poled polymer structure with a poled field strength of 1.33 MV/cm that was produced with a 1.5 μm-electrode gap and poling voltage of 200 volts, was observed. Measured $n_{TE}$ and $n_{Tm}$ values in Table 3 are from base time 0.0 hours (set at two actual hours after completion of the poled plasma deposition) to time 350 hours (approximately 14.5 days after completion of the poled plasma deposition) indicate essentially no change in $n_{TE}$ and $n_{TM}$ over the measured time period.

TABLE 3

Change in index of refraction for sample with a 1.5 μm-electrode gap and poling voltage of 200 volts

| Time (hr) | $n_{TM}$ | $\Delta n_{TM}$ from time 0.0 | % change in $\Delta n_{TM}$ | $n_{TE}$ | $\Delta n_{TE}$ from time 0.0 | % change in $\Delta n_{TE}$ | $\Delta n_{TM} - \Delta n_{TE}$ |
|---|---|---|---|---|---|---|---|
| 0.0 | 1.5133 | — | — | 1.5116 | — | — | — |
| 0.25 | 1.5133 | +0.0 | 0.0 | 1.5116 | 0.0 | 0.0 | 0.0 |
| 0.50 | 1.5133 | +0.0 | 0.0 | 1.5116 | 0.0 | 0.0 | 0.0 |
| 1.0 | 1.5133 | +0.0 | 0.0 | 1.5116 | 0.0 | 0.0 | 0.0 |
| 24 | 1.5134 | +0.001 | +0.064 | 1.5114 | −0.002 | −0.121 | 0.003 |
| 50 | 1.5133 | +0.0 | 0.0 | 1.5116 | 0.0 | 0.0 | 0.0 |
| 100 | 1.5133 | +0.0 | 0.0 | 1.5116 | 0.0 | 0.0 | 0.0 |
| 168 | 1.5134 | +0.001 | +0.064 | 1.5115 | −0.001 | −0.060 | 0.002 |
| 350 | 1.5134 | +0.001 | +0.064 | 1.5116 | 0.0 | 0.0 | 0.001 |

The change in $n_{TE}$ and $n_{TM}$ indicate that the produced poled plasma structure exhibits excellent index of refraction stability over the measured time period.

Thermal stability of a poled polymer film produced from the poled plasma deposition of the present invention was observed. A 1.5-μm thick layer of poled polymer film was formed on a 150-mm diameter 1,0,0 silicon wafer. The entire surface of a silicon substrate was poled during the plasma deposition by using the example of the invention illustrated in FIG. 3(a) and FIG. 3(b). The process parameters were as listed in Table 4.

TABLE 4

| Process parameters | |
|---|---|
| RF energy frequency | 13.56 MHz |
| Deposition energy density | 100 Watts |
| Poling voltage | 1.33 MV/cm |
| Plasma Chamber Deposition Pressure | 125 mtorr |

The resulting poled plasma film was heated from room temperature (approximately 28° C.) to approximately 150° C. and then allowed to cool down to room temperature. Deflection of the poled plasma film from its position at initial room temperature was continuously monitored during the heating (heating curve) and cooling (cooling curve) cycles and was as set forth in FIG. 4. The maximum observed positive and negative deflections (relative to 0.0 microns at room temperature), namely +1.05 microns at 50° C. and −1.20 microns at 90° C., indicate excellent thermal stability of the resulting poled plasma structure over the measured temperature range.

In one example of the invention, the plasma deposition reaction chamber system disclosed in U.S. Pat. No. 4,262,631 (the 631 system), which is incorporated herein in its entirety, is modified as disclosed below and used to perform the plasma deposition and poling process of the present invention. The RF plasma deposition reaction chamber system is referred to herein as the 631 system.

Figure 6:
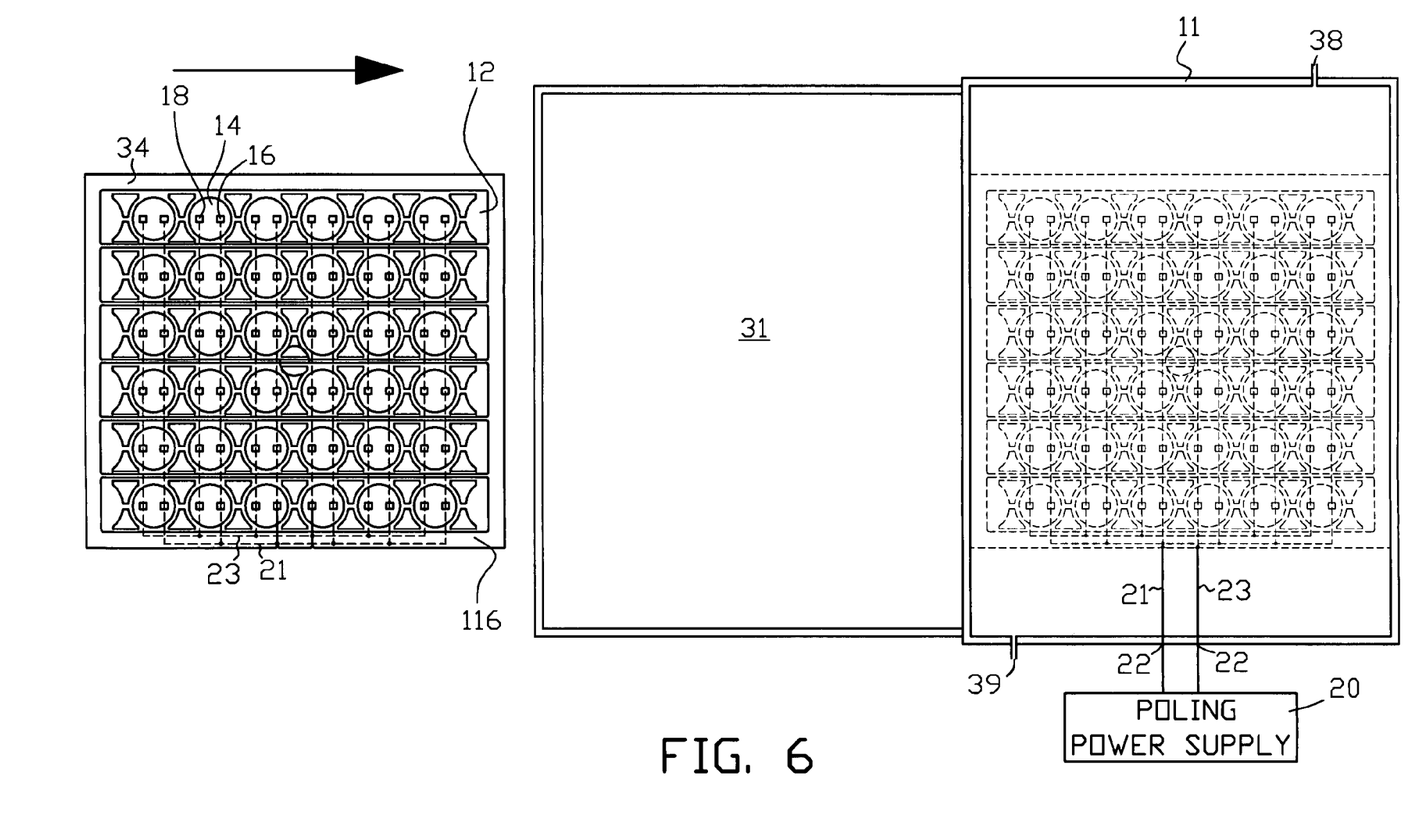
FIG. 6 illustrates one arrangement of poling electrodes forming a part of a frame.

The 631 system can be modified to include fixture poling electrodes. In the modified arrangement, as illustrated in FIG. 6 for example, the poling electrodes 16 and 18, may form a part of a frame 116, which would contain a platen 12 upon which one or more substrates 14 are mounted. The frame would be electrically floating with respect to the RF plasma electrodes. The frame, containing platens and substrates, is shown in two positions in FIG. 6: the first position (solid lines) is before loading into loadlock feature 31, and the second position (dashed lines) is in process chamber 11.

The loadlock feature 31 of the 631 system can be modified to accommodate multiple substrates on multiple platens so that the interior of the reaction chamber can be maintained at a non-contaminated substantially vacuum environment while substrates are loaded and unloaded from the chamber.

If the platen is electrically floating relative to the positive and ground plasma power electrodes, the 631 system can be modified with an electrical feedthrough to permit electrical contact to the substrate platen for applying the poling voltage between the platen and ground plasma power electrode. The 631 system is modified to provide electrical feedthroughs 22 for connectors 21 and 23 to the poling electrodes. The feedthroughs incorporate a glass to metal seal to permit an applied poling voltage as high as 10,000 volts. The feedthroughs are suitably sealed, for example, with o-rings, to maintain the vacuum integrity of the chamber. If necessary, RF blocking impedance elements, such as inductors, can be provided between connectors 21 and 23 and poling power supply 20 to prevent damage to the power supply from RF energy feedback through the exposed connectors and poling electrodes in the chamber.

The plasma deposition reaction and poling chamber system of the present invention may employ numerous variations within the scope of one skilled in the art and without deviating from the scope of the present invention. For example, multiple plasma-generating electrodes and RF power supplies may be used. Multiple ground electrodes may be used and may be formed as screen electrodes.

The foregoing examples do not limit the scope of the disclosed invention. The scope of the disclosed invention is further set forth in the appended claims.

The invention claimed is:

1. An apparatus for depositing a poled plasma film on a substrate, the apparatus comprising:
   a substantially air-tight chamber;
   a positive plasma-generating electrode disposed within the chamber;
   a plasma excitation power source having its output connected to the positive plasma-generating electrode;
   a ground electrode disposed within the chamber, the ground electrode connected to the electrical ground potential of the plasma excitation power source;
   a substrate fixtured in the chamber between the positive plasma-generating electrode and the ground electrode, the substrate electrically isolated from the positive plasma-generating electrode and the ground electrode;
   a positive poling electrode and a negative poling electrode, the positive and negative poling electrodes making contact with the substrate and arranged to form a plasma exposed gap between the positive and negative poling electrodes, the gap extending from at least the top surfaces of the poling electrodes to the bottom surfaces of the poling electrodes;
   a dc power source, the output of the dc power source connected to the positive and negative poling electrodes to create an electrostatic field between the electrodes; and
   an at least one inlet port and an at least one outlet port in the chamber for flowing an at least one plasma reactant through the chamber under pressure, whereby a poled plasma film is formed on the substrate in the plasma exposed gap by plasma excitation of the at least one reactant and poling of the film by the electrostatic field as the film is deposited in the plasma exposed gap for at least a partial extent of the gap while a substantially vacuum environment is maintained in the chamber.

2. The apparatus of claim 1 wherein the substrate is fixtured approximately in a central region between the positive plasma-generating electrode and the ground electrode.

3. The apparatus of claim 1 further comprising:
   a platen upon which a plurality of the substrates are fixtured;
   a frame containing the platen, the frame electrically isolated from the positive plasma-generating electrode and the ground electrode; and
   a loadlock for loading or unloading the frame into the chamber while maintaining the substantially vacuum environment in the chamber.

4. An apparatus for depositing a poled plasma film on a substrate, the apparatus comprising:
   a substantially air-tight chamber;
   a positive plasma-generating electrode disposed within the chamber;
   a plasma excitation power source having its output connected to the positive plasma-generating electrode;
   a ground electrode disposed within the chamber, the ground electrode connected to the electrical ground potential of the plasma excitation power source;
   a substrate fixtured in the chamber between the positive plasma-generating electrode and the ground electrode, the substrate electrically isolated from the positive plasma-generating electrode and the ground electrode;
   a positive poling electrode and a negative poling electrode disposed within the chamber, the positive and negative poling electrodes spaced apart to form a gap and positioned in the vicinity of a first surface of the substrate;
   a dc power source, the output of the dc power source connected to the positive and negative poling electrodes to create an electrostatic field between the electrodes, the electrostatic field penetrating at least partially through the substrate and into a plasma exposed deposition region within the electrostatic field above a second surface of the substrate, the second surface opposing the first surface of the substrate; and
   an at least one inlet port and an at least one outlet port in the chamber for flowing an at least one plasma reactant through the chamber under pressure, whereby a poled plasma film is formed on the substrate in the plasma exposed deposition region by plasma excitation of the at least one reactant and poling of the film by the electrostatic field as the film is deposited in the plasma exposed deposition region while a substantially vacuum environment is maintained in the chamber.

5. The apparatus of claim 4 wherein the substrate is fixtured approximately in a central region between the positive plasma-generating electrode and the ground electrode.

6. The apparatus of claim 4 further comprising:
   a platen upon which a plurality of the substrates are fixtured;
   a frame containing the platen, the frame electrically isolated from the positive plasma-generating electrode and the ground electrode; and
   a loadlock for loading or unloading the frame into the chamber while maintaining the substantially vacuum environment in the chamber.

7. An apparatus for depositing a poled plasma film on a substrate, the apparatus comprising:
   a substantially air-tight chamber;
   a positive plasma-generating electrode disposed within the chamber;
   a plasma excitation power source having its output connected to the positive plasma-generating electrode;
   a ground electrode disposed within the chamber, the ground electrode connected to the electrical ground potential of the plasma excitation power source;
   a substrate fixtured in the chamber between the positive plasma-generating electrode and the ground electrode, the substrate electrically isolated from the positive plasma-generating electrode and the ground electrode;
   a positive poling electrode disposed within the chamber, the positive poling electrode positioned in the vicinity of a first surface of the substrate, the first surface of the substrate facing away from the ground electrode;

a dc power source, the output of the dc power source connected to the positive poling electrode and ground electrode to create an electrostatic field between the positive poling electrode and ground electrode, the electrostatic field penetrating through the substrate and into a plasma exposed deposition region within the electrostatic field above a second surface of the substrate, the second surface opposing the first surface of the substrate; and an at least one inlet port and an at least one outlet port in the chamber for flowing an at least one plasma reactant through the chamber under pressure, whereby a poled plasma film is formed on the substrate in the plasma exposed deposition region by plasma excitation of the at least one reactant and poling of the film by the electrostatic field as the film is deposited in the plasma exposed deposition region while a substantially vacuum environment is maintained in the chamber.

8. The apparatus of claim 7 wherein the surface of the positive poling electrode has an area equal to the area of the first and second surfaces of the substrate so that the plasma exposed deposition region comprises the entire area of the second surface of the substrate.

9. The apparatus of claim 7 wherein the substrate is fixtured approximately in a central region between the positive plasma-generating electrode and the ground electrode.

10. The apparatus of claim 7 further comprising:

a platen upon which a plurality of the substrates are fixtured;

a frame containing the platen, the frame electrically isolated from the positive plasma-generating electrode and the ground electrode; and a loadlock for loading or unloading the frame into the chamber while maintaining the substantially vacuum environment in the chamber.

* * * * *